Oct. 24, 1939.   A. H. B. WALKER   2,177,556
APPARATUS FOR AUTOMATICALLY CONTROLLING THE
CURRENT IN AN ALTERNATING CURRENT CIRCUIT
Filed Dec. 31, 1936

INVENTOR
Alec Hervey Bennett Walker.
BY
HIS ATTORNEY

Patented Oct. 24, 1939

2,177,556

UNITED STATES PATENT OFFICE 2,177,556

APPARATUS FOR AUTOMATICALLY CONTROLLING THE CURRENT IN AN ALTERNATING CURRENT CIRCUIT

Alec Hervey Bennett Walker, London, England, assignor, by mesne assignments, to The Union Switch & Signal Company, Swissvale, Pa., a corporation of Pennsylvania Application December 31, 1936, Serial No. 118,614
In Great Britain January 24, 1936

2 Claims. (Cl. 175—363)

This invention relates to apparatus for automatically controlling the current in an alternating current circuit of the kind comprising an inductance or choke coil connected in the circuit and provided with a magnetic circuit, the degree of saturation of which is arranged to be varied by means of a saturating winding adapted to be supplied with direct or rectified current.

According to the invention there is connected, in series with the inductance or choke coil and across the source of supply of alternating current to the circuit to be controlled, a further inductance or choke coil having a magnetic circuit the flux density of which is arranged to be in the neighborhood of the upper bend of the saturation curve when the alternating current voltage is at its lower limit and the circuit load is relatively light, so as properly to compensate for variations in the supply voltage.

In order to adjust the action of the further inductance or choke coil to give the required compensating effect, an impedance or impedances may be associated therewith. The impedance or impedances may be arranged to be adjustable in order to facilitate the adjustment of the action of the further inductance or choke coil and may be constituted by a resistance or resistances or by a condenser or condensers. By associating a condenser or condensers with further inductance or choke coil the shunt circuit across the source of supply of alternating current constituted by the further inductance or choke coil may be made resonant, thus increasing the sensitivity of the compensating arrangements to variations in the supply voltage.

Furthermore, the degree of saturation of the magnetic circuit of the further inductance or choke coil may be arranged to be varied by means of a winding arranged to be supplied with direct or rectified current.

The invention is particularly although not exclusively applicable to apparatus in which a direct current load is arranged to be supplied with unidirectional current from an alternating current supply circuit through a rectifier, and in order that the invention may be clearly understood its application to apparatus of this character will now be described by way of example with reference to the accompanying drawing, Figures 1 and 2 of which illustrate alternative circuit arrangements.

Figure 1:
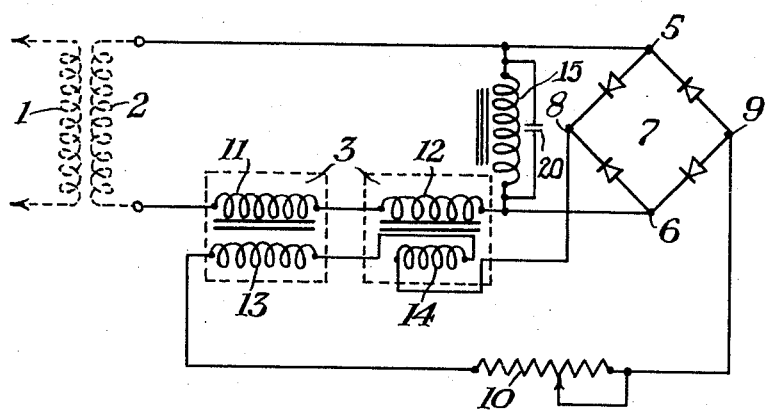

Referring first to Figure 1, the source of supply of alternating current is connected to the primary winding 1 of a suitable transformer, the secondary winding 2 of which is connected in series with the alternating current windings of an inductance or choke device 3 to the input terminals 5, 6 of a full wave rectifier 7 of the well known dry surface contact type, the output terminals 8, 9 of the rectifier being connected to the load circuit indicated at 10.

The inductance or choke device 3 is shown in a diagrammatic manner and comprises a magnetic core provided with an alternating current winding 11 connected in series with a similar winding 12 provided on the other core of the choke device 3. The direct current windings 13, 14 of the choke device 3 are connected in series with the load circuit 10 and are so inductively related to the alternating current windings 11, 12 that the alternating current voltages induced in the two direct current windings 13, 14 of the device are in opposition and are thus neutralized as regards their effect upon the load circuit, it being understood, of course, that the unidirectional fluxes which are set up in the choke device 3 by windings 13 and 14 are not neutralized and produce a saturating effect therein. Saturable choke devices of this general type are well known and may be of any suitable type provided that the alternating current effect in windings 13 and 14 is neutralized and provided further that these windings have a cumulative effect with respect to the impedance of windings 11 and 12.

A further inductance or choke device 15 is connected across the input terminals of the rectifier and is thus connected in series with the alternating current windings 11, 12 of the other inductance or choke device 3 across the secondary winding 2 of the transformer. This further inductance or choke device 15 has a magnetic circuit the flux density of which is arranged to be in the neighborhood of the upper bend of the saturation curve, when the alternating current voltage is at its lower limit and the rectifier is subject to a relatively light load.

Variations in the alternating current supply voltage will cause greatly magnified variations of the current flowing through the inductance or choke device 15, thus causing variations in the ratio of the effective ampere-turns of the alternating current windings 11, 12 of the inductance or choke device 3 to the ampere-turns of the direct current windings 13, 14 of the said device in such a way as properly to compensate for the variations in the supply voltage.

Furthermore, as a result of the usual or normal action of the inductance or choke device 3, the alternating current voltage across the input terminals 5, 6 of the rectifier 7 and across the inductance or choke device 15 will be varied in accordance with the current consumed by the load 10, and it will thus be evident that the action of the inductance or choke device 15 properly to compensate for variations in the supply voltage is extended over the whole range of load to which the rectifier 7 may be subjected.

Figure 2:
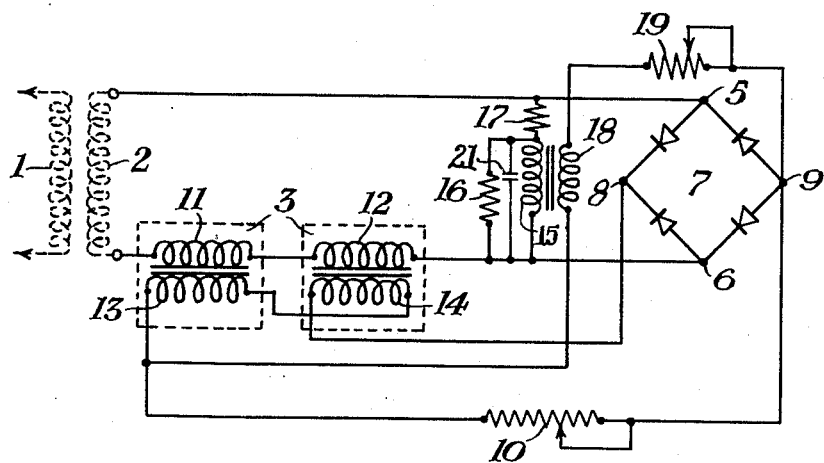

Referring now to Figure 2, in order to adjust the action of the further inductance or choke device 15 to give the required compensating effect, an impedance 16 is connected in parallel therewith and a further impedance 17 connected in series with the inductance or choke coil 15 in the shunt circuit across the input terminals 5, 6 of the rectifier. The impedances 16, 17 may be arranged to be adjustable in order to facilitate the adjustment of the action of the inductance or choke device 15 and may be constituted by resistances or by condensers. By employing condensers such as 20 in Fig. 1 and 21 in Fig. 2, for example, the shunt circuit may be made resonant, thus increasing the sensitivity of the compensating arrangements to variations in the supply voltage.

Furthermore, the degree of saturation of the magnetic circuit of the inductance or choke device 15 is arranged to be varied by means of a saturating winding 18 arranged to be connected in series with a variable resistance 19 and the direct current windings of the other inductance or choke device, this saturating winding 18 and variable resistance 19 being in parallel with the load 10. The alternating current voltages induced in the saturating winding 18 may be neutralized as described above in connection with the inductance or choke device 3.

Thus the direct current voltage across the load 10 will have an additional controlling effect on the action of the shunt inductance or choke device 15, since an increase in this voltage will further saturate the magnetic circuit of the latter and consequently cause a reduction in output as described hereinbefore. This compensating action will occur whether the increase in output is due to variation of the alternating current supply voltage or to incorrect action of the choke 3.

It will be evident that the invention is not limited to the particular circuit arrangements hereinbefore described and illustrated by way of example which may be varied as desired to suit particular requirements without exceeding the scope of the invention.

Having now particularly described and ascertained the nature of my said invention and in what manner the same is to be performed, I declare that what I claim is:

1. Voltage regulating apparatus comprising, in combination, a source of alternating current, a rectifier having its input circuit energized from said source, a saturable reactor connected in the input circuit of said rectifier, an impedance connected across the input circuit of said rectifier between said reactor and the rectifier, a load energized from the output circuit of said rectifier, means responsive to the load current delivered by said rectifier for varying the saturation of said reactor, and means responsive to the voltage delivered by the rectifier to said load for varying the effectiveness of said impedance.

2. Voltage regulating apparatus comprising, in combination, a source of alternating current, a rectifier having its input circuit energized from said source, a first saturable reactor connected in the input circuit of said rectifier, a second saturable reactor connected across the input circuit of said rectifier between said first reactor and the rectifier, a load energized from the output circuit of said rectifier, means responsive to the load current delivered by said rectifier for varying the saturation of said first reactor, and means responsive to the voltage delivered by the rectifier to said load for varying the saturation of said second reactor.

ALEC HERVEY BENNETT WALKER.